United States Patent
Parish et al.

(10) Patent No.: US 12,067,344 B2
(45) Date of Patent: *Aug. 20, 2024

(54) CUSTOMIZED AGREEMENT GENERATION

(71) Applicant: DocuSign, Inc., San Francisco, CA (US)

(72) Inventors: Stephen Parish, Midway, UT (US); Julianne Wu Ashlock, San Francisco, CA (US); Palash Agrawal, San Francisco, CA (US); Pavan Kumar Nallanchakravarthula, Port Moody (CA); Collin Tibbetts, Kirkland, WA (US); Brian Iversen, Concord, CA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,841

(22) Filed: May 3, 2023

(65) Prior Publication Data

US 2023/0419013 A1 Dec. 28, 2023

Related U.S. Application Data

(63) Continuation of application No. 17/846,789, filed on Jun. 22, 2022, now Pat. No. 11,645,446.

(51) Int. Cl.
*G06F 40/186* (2020.01)
*G06F 40/106* (2020.01)
(Continued)

(52) U.S. Cl.
CPC ............ *G06F 40/106* (2020.01); *G06F 40/14* (2020.01); *G06F 40/186* (2020.01); *G06F 40/197* (2020.01)

(58) Field of Classification Search
CPC ...... G06F 40/106; G06F 40/14; G06F 40/186; G06F 40/197
See application file for complete search history.

(56) References Cited

U.S. PATENT DOCUMENTS 11,645,446 B1 5/2023 Parish et al.
2017/0315979 A1* 11/2017 Boucher ................. G06F 40/18
(Continued)

FOREIGN PATENT DOCUMENTS

EP 1221661 A2 7/2002

OTHER PUBLICATIONS

Notice of Allowance from U.S. Appl. No. 17/846,789 dated Jan. 5, 2023, 9 pp.
(Continued)

*Primary Examiner* — Hassan Mrabi
(74) *Attorney, Agent, or Firm* — Shumaker & Sieffert, P.A.

(57) ABSTRACT

A document management system generates and validates online documents. The document management system enables the customization of an online document through various rendering parameters for customizing the appearance of agreement content rendered to a receiving entity. The document management system may validate the rendering parameters of customized online documents to determine a likelihood that the documents are valid. For example, the system may determine a likelihood that an online document generated with prechecked checkbox is invalid. The document management system may recommend custom templates for online documents or modifications to an online document that may increase a likelihood of achieving an originating entity's objective. For example, the document management system can apply a machine-learned model to recommend a target rendering parameter for inclusion that
(Continued)

would increase the likelihood of a receiving entity clicking an "Agree" button.

20 Claims, 9 Drawing Sheets

(51) Int. Cl.
*G06F 40/14* (2020.01)
*G06F 40/197* (2020.01)

(56) References Cited

U.S. PATENT DOCUMENTS

| | | | |
|---|---|---|---|
| 2019/0251145 A1* | 8/2019 | Finn | G06F 9/451 |
| 2019/0251186 A1* | 8/2019 | Finn | G06F 40/117 |
| 2020/0117705 A1* | 4/2020 | Hance | G06F 16/152 |
| 2020/0372205 A1 | 11/2020 | Bradley et al. | |
| 2021/0350276 A1 | 11/2021 | Ashlock et al. | |
| 2021/0406450 A1 | 12/2021 | Kumar et al. | |
| 2022/0108065 A1* | 4/2022 | Eshghi | G06F 16/164 |

OTHER PUBLICATIONS

U.S. Appl. No. 17/846,784, filed Jun. 22, 2022, naming inventors Parish et al.

\* cited by examiner

Terms and Conditions

I, Full Name, agree to the following:

My current employment information below is correct:

- Employer: Company
- Job Title: Job Title
- Email Address: Email

Signed on Date

☐ By clicking on the AGREE button, Electronic Certification is provided.

[AGREE]

---

Terms and Conditions

I, Mary Wilson, agree to the following:

My current employment information below is correct:

- Employer: Test Company Name
- Job Title: QA
- Email Address: mary@companyname.com Signed on 2022-02-22

☑ By clicking on the AGREE button, Electronic Certification is provided.

[AGREE]

```
1   example.Clickwrap.render({
2       environment: 'https://stage.example.net',
3       accountId: '1234cd32-qwe1-3rt2-y1',
4       clickwrapId: 'b823b3-9d21k-je21-21q9jds',
5       documentData: {
6           email:    'mary@companyname.com',
7           fullName: 'Mary Wilson',
8           date:     '2022-02-22',
9           company:  'Testing',
10          title:    'QA'
11      },
12      style: {
13          header: {
14              display: 'none'
15          },
16          container: {
17              backgroundColor: '#fff',
18          },
19          agreementStatement: {
20              fontweight: 'normal'
21          },
22          documentButton: {
23              height: '40px',
24              width: '100%',
25              margin: '10px 0'
26          }
27          :
28      }
29  })
```

902
Receive, from a client device of a receiving entity, a request for an online document, an interaction with the online document by the receiving entity causing a completion of the online document

904
Determine a feature of the receiving entity from a profile characterizing the receiving entity

906
Input a representation of the feature and a target rendering parameter into a machine-learned model

908
Receive, as an output from the machine-learned model, a likelihood that the interaction is performed by the receiving entity

910
Modify the online document to include the target rendering parameter

912
Provide the modified online document to the receiving entity for the completion of the modified online document

FIG. 9

CUSTOMIZED AGREEMENT GENERATION

This application is a continuation of U.S. application Ser. No. 17/846,789, filed Jun. 22, 2022, the entire contents of which are incorporated by reference herein.

TECHNICAL FIELD

The disclosure generally relates to generating online documents, and more particularly to validating and customizing online documents.

BACKGROUND

Conventional documents can be executed with wet signatures as a record of certification or agreement from a person before accessing a resource. For example, a patron of a library may sign a terms and conditions agreement before receiving a library card to borrow books. However, with the convenience of online access to content (e.g., software as a service, multimedia, educational material, public databases, etc.), providing consent or agreement online is also increasingly prevalent. For example, a user of an online library may execute a click-to-sign agreement before accessing electronic books.

Conventional document execution is subject to strict criteria to ensure a valid and enforceable agreement has been made upon execution. The online medium has presented additional criteria that represent challenges to generating customized documents. While word processing can provide various formatting customization parameters for online documents such as font, paragraph, positioning, etc., the customization is constrained by these criteria for valid and enforceable agreements.

Conventional documents may be manually evaluated to determine whether the agreement is valid. However, many of the criteria for determining whether an online document is valid may be challenging for manual evaluation. For example, it is difficult for the human eye to determine whether an online document's font size(s) for text of agreement language has met criteria for enforceability.

While a conventional electronic document may be generated with a word processing application and manually validated such that its execution is likely to be valid, modified versions of this online document may no longer be valid. Online documents are presented for execution in various contexts (e.g., websites, devices, locations, etc.) and the originators of the documents may wish to have the documents customized for their recipients (e.g., an agreement to have a font style matching their website's fonts). It is difficult to manually validate each modification of an online document, and the execution of invalid online documents not only result in a worthless agreement but waste the processing and storage space expended to generate, execute, and store invalid online documents. Furthermore, each customized and valid online document is typically stored for auditing purposes, and this takes up a vast amount of memory resources (e.g., the storage needed for a social networking website with millions of users who each must execute a terms of agreement before using the website). Thus, even electronic documents present technological problems for generating and validating agreement documents.

SUMMARY

Systems and methods are disclosed herein for a document management system that generates and validates online documents. The document management system enables originating entities to customize an online document through various rendering parameters such as placement of text, size of a window, font formatting, parameters for customizing an input element(s) for executing the document (e.g., a button for a click-to-sign agreement), or any suitable parameter for customizing the appearance agreement content rendered to a receiving entity. The document management system may validate the customized online documents. For example, the system applies a machine-learned model trained using valid or invalid online documents to determine a likelihood of a customized document to be valid. The document management system can allow originating entities to incorporate their customized online documents into their platforms (e.g., using an iframe to incorporate the customized agreement into the originating entity's website). After a receiving entity has executed the online document, the document management system may store the metadata of the online document rather than the document itself. For example, by storing the rendering parameters used to generate the document and a certificate of completion of the online document, the document management system may conserve the additional memory resources that would be needed to store the larger file of the document itself. The document management system may provide a secured domain in which the online documents may be generated and validated (e.g., using encryption and multi-factor authentication). This secured domain may further help ensure that the online documents provided by the document management system are valid.

The document management system can validate rendering parameters of an online document to determine a likelihood that the document is valid. In one embodiment, the document management system may receive, from a client device, a user selection of a rendering parameter for an online document. The content of the online document may be rendered for display using one or more rendering parameters. The system may then input the user-selected rendering parameter into a machine-learned model and receive, as output from the model, a validity classification of the online document. In response to the validity classification indicating that the online document is invalid, the document management system may provide a notification to the client device for display identifying the rendering parameter.

For example, as an originating entity is customizing an online document on a graphical user interface (GUI) generated by the online document system, their selection of moving an "Agree" button from the bottom of the online document to the top of the online document is flagged as likely causing the online document to be an invalid agreement document. As the user interacted with the GUI, the document management system tracked the position of the button on the online document during the dragging interaction and applied the position, a rendering parameter, to a machine-learned model that determined the position at the top of the online document would likely render the online document invalid.

The document management system may recommend custom templates or modifications to an online document that may increase a likelihood of achieving an originating entity's objective. For example, the document management system can apply a machine-learned model to recommend a target rendering parameter for inclusion, modification, or exclusion that would increase the likelihood of a receiving entity clicking an "Agree" button. In one embodiment, the document management system may receive, from a client device of a receiving entity, a request for an online document. The content of the online document may be rendered using one or more rendering parameters. An interaction with the online document by the receiving entity may cause the completion of the online document. The system may determine a feature of the receiving entity from a profile characterizing the receiving entity. The system may then input a representation of the feature and a target rendering parameter into a machine-learned model and receive, as an output from the model, a likelihood that the interaction is performed by the receiving entity. The system may then modify the online document to include the target rendering parameter and provide the modified online document to the receiving entity for completion of the modified online document.

For example, the document management system recommends an increased font size for an online document in response to applying the online document and a feature of the receiving entity indicating the user is vision impaired to the machine-learned model. The online documents modified by the document management system may also be validated by the document management system so that a valid, customized online document is provided to the receiving entity.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a system environment in which a document management system operates, in accordance with one embodiment.

FIG. 3 shows a conceptual illustration of an online document generated by the document management system, according to one embodiment.

FIG. 9 is a flowchart illustrating a process for customizing an online document before execution using the document management system of FIG. 1, in accordance with one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Environment

Figure 1:
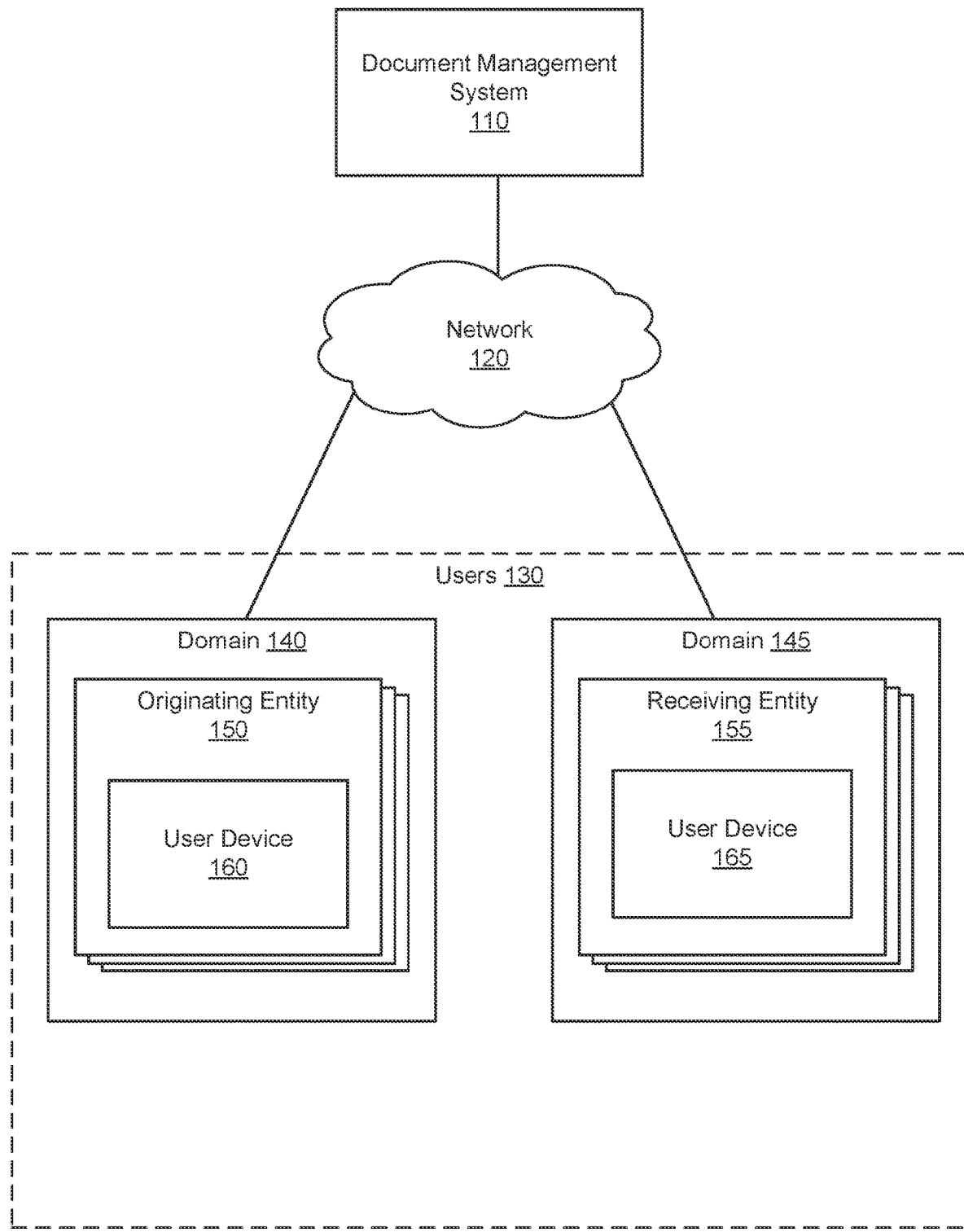

FIG. 1 is a block diagram of a system environment 100 in which a document management system 110 operates, in accordance with one embodiment. System environment 100 includes the document management system 110, a network 120, users 130 which includes a subset of originating entities 150 associated with a domain 140 and a subset of receiving entities 155 associated with a domain 145. Each of originating entities 150 and receiving entities 155 can be associated with respective user devices (e.g., a user device 160 or a user device 165). In alternative configurations, different and/or additional components may be included in the system environment 100. The document management system may be a centralized or a de-centralized management system. For example, the operations can be performed at least in part by software applications of a de-centralized system installed on individual user devices.

The document management system 110 is a computer system (or group of computer systems) for storing and managing documents and/or envelopes for users 130. Using document management system 110, the users 130 can collaborate to create, edit, review, negotiate, and execute documents. The terms "execute" and "complete" may be used interchangeably herein to refer to an online document of the document management system 110 that has been accessed for electronic signature (e.g., click-to-sign) by a receiving entity. The document management system 110 allows the users 130 to generate and modify a collection of one or more agreement documents, which may also be referred to as a "document envelope" or "envelope." The envelope may include at least one agreement document for execution. The document management system 110 may provide the at least one agreement document (e.g., a contract, purchase order, non-disclosure agreement, terms of service agreement, or other suitable document) in which terms have been agreed upon by two or more domains (e.g., by two or more of the users 130 from the domain 140 and the domain 145) to the receiving entity 155 of the domain 145 for execution, as described above. The document management system 110 may generate an envelope per a request from the originating entity 150 of the domain 140. In some embodiments, the document management system 110 enforces a set of document permissions for accessing or modifying the envelope.

The document management system 110 enables the customization of online documents. One example of an online document is a clickwrap. The document management system 110 may generate an online document based on an originating entity's selection of rendering parameters (e.g., heading style, font type, window size, button location, button type, etc.). The document management system 110 may determine a likelihood that the customized online document is valid. For example, the document management system 110 may determine that a user's selected location of an "Agree" button on a clickwrap is not prohibited for receiving entities in a particular location, and thus would likely be an invalid online document. The document management system 110 may recommend modifications to the customized online documents that would increase a likelihood of achieving a particular objective. For example, the document management system 110 may determine that increasing a value for a font size rendering parameter would increase the likelihood of a vision-impaired receiving entity to complete the online document.

The document management system 110 may, rather than store online documents, store a collection of rendering parameters that can be used to generate online documents as they are requested. This may conserve memory space at the server hosting the document management system 110, as the metadata (e.g., the rendering parameters) may occupy less memory space than the online document itself. After an online document is completed by a receiving entity, the document management system 110 can store the rendering data of the online document along with a certificate of completion (e.g., a signature tag including a name, date, and signature) that can be used for subsequent querying of the completed agreement document (e.g., for auditing purposes). The metadata stored by the document management system 110 may also correspond to a specific version of the online document. The version of an online document can be characterized by a particular combination of rendering parameters used to generate the version, documents that the receiving entity agreed to after completing the online document (e.g., agreeing to a privacy policy that was embedded via a uniform resource locator (URL) in the online document). Additionally, the metadata of an online document may include a version identifier of the online document.

The document management system 110 may control and validate changes made to an online document. For example, the document management system 110 may validate that any change made to an online document is a change to a version of the online document that is presented for execution. The document management system 110 may prompt a user who has previously executed the online document prior to the change to execute a version incorporating the change. In some embodiments, the document management system 110 may determine that an online document presented to a user for execution is a valid document for execution. For example, the document management system 110 may validate that an online agreement rendered in a webpage is not blocked or covered by other components in the webpage. The webpage may be hosted by a third-party, where the other components in the webpage are the third-party's components. The document management system 110 may render and record the locations of the online document and other webpage components within a webpage. For example, the document management system 110 may receive rendering parameters of the third-party's components in addition to the rendering parameters of the online document. The document management system 110 may then use the recorded locations to determine that the online document is not blocked or covered by other components in the webpage. For example, the document management system 110 can compare a webpage coordination location and dimensions of the online document rendered in the webpage to the webpage coordinate locations and dimensions of images, advertisements, navigation bars, etc. generated by the third-party to determine that the online document was not blocked by the other webpage components in the webpage.

The document management system 110 can be a server, server group or cluster (including remote servers), or another suitable computing device or system of devices. In some embodiments, the document management system 110 can communicate with the user devices 160 and 165 over the network 120 to receive instructions and send envelopes for access on the user devices 160 and 165. As referred to herein, the terms "user device" and "client device" are interchangeable unless otherwise specified or apparent from the context in which the terms are used. The document system 110 may also communicate with the user devices 160 and 165 over the network 120 to receive instructions for creating or modifying document models. The document management system 110 is discussed in further detail with respect to FIG. 2.

The document management system 110 may operate in a secured domain. Accordingly, online documents of the document management system 110 may be generated in a secured domain characterized by one or more of the document management system generating the online documents, authentication requirements enforced by the document management system, malware protection for the document management system, encryption of the online documents, or secured access to the online documents. The document management system may be a centralized system, where the centralization can contribute to the presence of the secured domain.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, IEEE 802.11, 4G, 5G, code division multiple access (CDMA), digital subscriber line (DSL), and the like. Data exchanged over network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the document management system 110 can communicate with the user devices 160 and 165 associated with the users 130. A user can represent an individual, group, or other entity that is able to interact with envelopes generated and/or managed by the document management system 110. Each user can be associated with a username, email address, or other identifier that can be used by the document management system 110 to identify the user and to control the ability of the user to view, modify, and otherwise interact with envelopes managed by the document management system 110. In some embodiments, the users 130 can interact with the document management system 110 through a user account with the document management system 110 and the one or more user devices 160 and 165 accessible to the users 130.

As described above, a domain (e.g., the domains 140 and 145) is a business, group, individual, or the like that is associated with a set of users and one or more envelopes in the document management system 110. For example, an envelope may originate at the domain 140 and be sent to the domain 145 for viewing, editing, and execution. In one embodiment, the envelope may be created by the originating entity 150 and be sent via the document management system 110 to the receiving entity 155 during the execution of the one or more documents included within the envelope.

In the embodiment of FIG. 1, the originating entity 150 from the domain 140 can create an envelope via the document management system 110. In this example, the domain 140 includes a set of originating entities 150 which, as used herein, are a subset of the users 130 who have user accounts with the document management system 110. The domain 145 includes a set of receiving entities 155 which, as used herein, are a subset of the users 130 who have user accounts with the document management system 110. The envelope is sent by the document management system 110 for review and execution by a receiving entity of the domain 145.

A user device (e.g., the user devices 160 and 165) is a computing device capable of receiving user input as well as transmitting and/or receiving data to the document management system 110 via the network 120. For example, a user device can be a desktop or a laptop computer, a smartphone, tablet, or another suitable device. Each user device may have a screen for displaying content (e.g., videos, images, content items, or online documents to be executed) or receiving user input (e.g., a touchscreen). User devices are configured to communicate via the network 120. In one embodiment, a user device executes an application allowing a user of the user device to interact with the document management system 110. For example, a user device can execute a browser application to enable interaction between the user device and the document management system 110 via the network 120. In some embodiments, a single user can be associated with multiple user devices, and/or one user device can be shared between multiple users who may, for example, log into a personal account on the user device to access the document management system 110.

Document Management System

Figure 2:
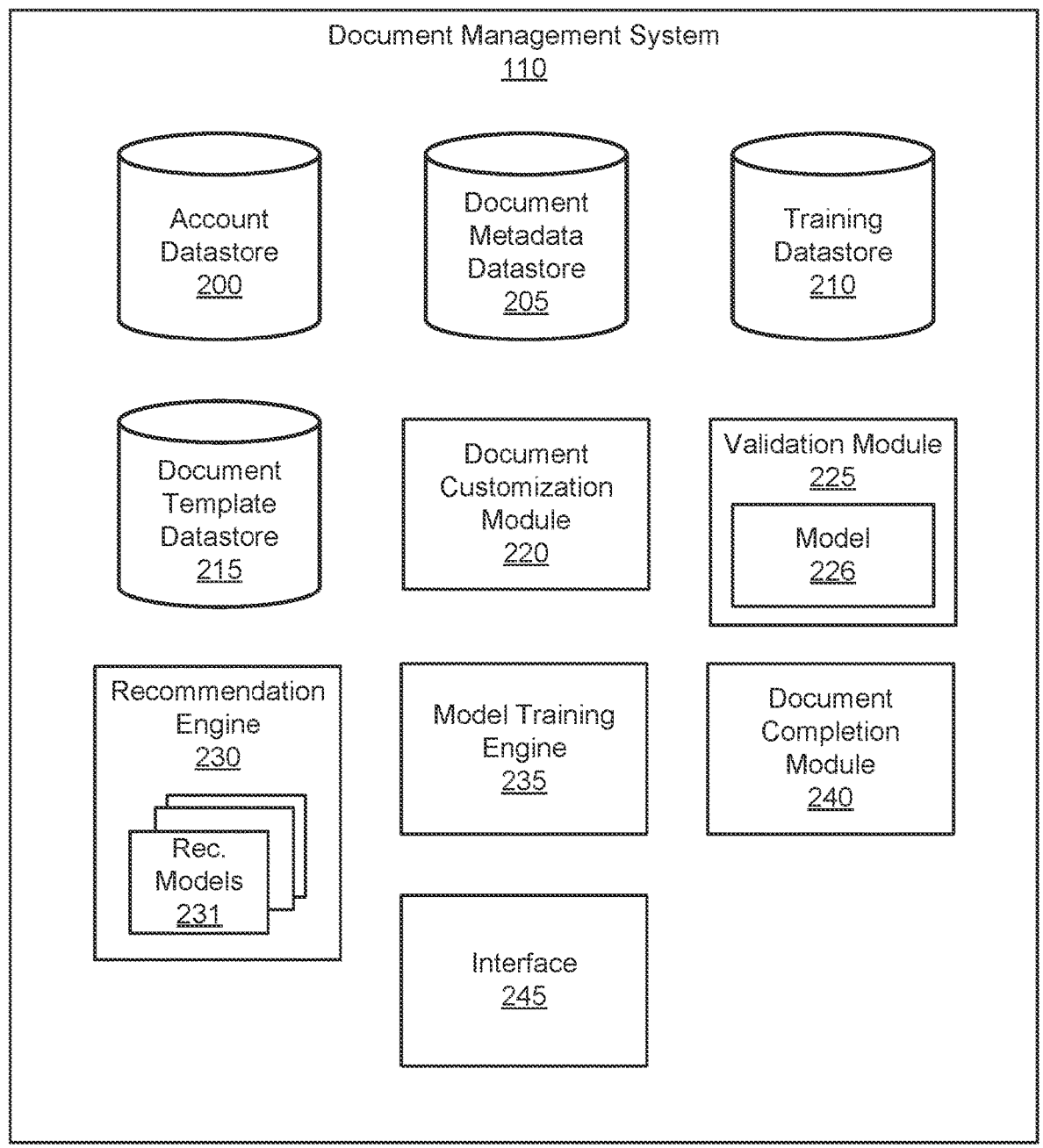
FIG. 2 is a block diagram of the document management system of FIG. 1, in accordance with one embodiment.

FIG. 2 is a block diagram of a document management system 110 of FIG. 1, in accordance with one embodiment. The document management system 110 includes or accesses local databases such as an account datastore 200, a document metadata datastore 205, a training datastore 210, and a document template datastore 215. Document management system 110 includes software modules such as a document customization module 220, a validation module 225, a recommendation engine 230, a model training engine 235, and a document completion module 240. Document management system 110 includes one or more statistical or machine-learned models 226 and 231. The document management system 110 includes an interface 245, which may include hardware and/or software components, that enable the document management system 110 to communicate with user devices or third-party platform servers through the network 120. The document management system 110 may have alternative configurations than shown in FIG. 2, including different, fewer, or additional components.

The account datastore 200 is a file storage system, database, set of databases, or other data storage system storing information associated with accounts of the document management system 110. The domains 140 and 145 may be associated with one or more accounts with the document management system 110. In some embodiments, a domain may be associated with a parent account and each entity within the domain may be associated with a user account. For example, the domain 145 has a parent account and each receiving entity 155 within the domain 145 has a user account with the document management system 110. The parent account may be associated with a policy of the domain 145 and/or an org chart for the domain 145. A policy of the domain 145 is a system of principles that guide certain processes or workflows for the domain 145. For example, a policy of the domain 145 may dictate which receiving entities 155 within the domain 145 are to receive envelopes and a set of tasks the receiving entities 155 are to perform in relation to the envelopes.

Each user account associated with an entity may include information about the entity, such as information about the individual with access to the user account, age of the account, frequency of account use, log of past account transactions, and the like. Information about the individual with access to the account may include the individual's name, email address, title, role, department, and the like. The individual's title is a position title or job title held by the individual with the domains 140 and 145. The individual's role is a function that the individual fulfills within their domain. For example, a title may be "General Counsel" and a role may be reviewing and executing agreements. The individual's department is a group within the domain where the individual works. For example, a department may be operations, finance, sales, human resources, purchases, legal, and the like.

The document metadata datastore 205 is a file storage system, database, set of databases, or other data storage system storing metadata describing online documents of the document management system 110. The metadata may include rendering parameters used to render for display content of the online documents. For example, content may be a text of the terms of an agreement and the rendering parameters may describe how the text is displayed Rendering parameters may include a font type, font size, font color, location of content (e.g., text, images, hyperlinks) within the online document (e.g., a z-coordinate of a webpage or frame), a size of a window or frame used to display content, indentation of text, justification of text, or any suitable parameter affecting the appearance of content within the online document. In this way, the document metadata datastore 205 may be accessed to customize online documents.

In some embodiments, the document metadata datastore 205 may further include a datastore for metadata of completed online documents mapped to a certificate of completion. A certificate of completion may be metadata of an online document indicating that a user has provided a signature (e.g., electronic signature) to be associated with the online document. Online documents may be a word processing document or any suitable electronic document suitable for accompaniment by a signature. For example, an online document may be a word processing document of a vendor sales contract that is signed by a consumer and a merchant. The signatures may be electronic. Example signatures may include an electronically rendered signature of a user's handwritten signature, a typographic representation of the user's name or any suitable identifier, or a selection of a button that is associated with an authenticated online account or any suitable identifier of a user. For example, a user may click an "Accept" button displayed towards the bottom of a web page that includes a Terms and Conditions agreement contract, where the selection of the "Accept" button is a type of signature (i.e., click-to-sign) that may be associated with a user's online account used to access the web page or the user's internet protocol (IP) address that identifies the user.

A certificate of completion may include metadata such as a name of the user providing their signature, the date or time at which the signature was provided, or the signature (e.g., an image file of an electronic signature). The document metadata store 205 may store mappings of rendering parameters of an online document that are mapped to a certificate of completion (e.g., a data structure of key value pairs, where the key is a user identifier and the values include the rendering parameters, their values, and a certificate of completion). The document metadata datastore 205 may be accessed to generate online documents that have already been completed. For example, a merchant may request to view the signed copy of a vendor contract by querying the document management system 110, which uses the rendering parameters, rendering parameter values, and the certificate of completion(s) associated with the vendor contract to generate the signed online document upon request.

The training datastore 210 is a file storage system, database, set of databases, or other data storage system storing data about historical online documents for training machine-learned models of the document management system 110. Historical online documents include online documents that have been presented by the document management system 110 for execution by a receiving entity. Data about historical online documents may include the content and metadata (e.g., rendering parameters used to display the content of the online documents) of the historical online documents. The data may further include the document type of the historical online documents, where the document type can be representative of a format or purpose for the document. Examples of document types include a purchase agreement, codes of conduct, lease agreements, bank forms, permission slips, term sheets, etc. The training datastore 210 may also store data about the generation, delivery, and presentation of the historical online documents. This data may be referred to as contextual information.

Contextual data stored within the training datastore 210 may include an identifier of the originating entity authoring the online document, an identifier of the receiving entity receiving the online document, an IP address used to create or receive the online document, hardware identifiers of client devices of the originating or receiving entities, or data about user interactions with the online document. The user interactions may include interactions by a receiving entity with the online document. Example user interactions include scrolling through an online document, clicking a hyperlink within the online document, opening the online document, a duration of time for which the document is opened, editing the online document, comments added to the online document, providing an electronic signature for association with the online document, etc. The data in the training datastore 210 may be labeled to describe the online document (e.g., whether it was valid or met an objective such as a particular completion rate). For example, the training datastore 210 may include a data structure mapping rendering parameters of a historical online document, contextual information, and a label indicating that the historical online document was not completed after being presented to a historical receiving entity.

The document template datastore 215 is a file storage system, database, set of databases, or other data storage system storing templates for generating an online document. The template may include a combination of rendering parameters that have been manually selected by the user, recommended by the document management system 110, or a combination thereof. The document management system 110 may categorize the templates for storage within the document template datastore 215 such that a particular template may be selected based on its category. For example, an originating entity selects to render an agreement using a Times New Roman font type and a size eighteen font for receiving entities whose profiles indicate that they have a visual impairment feature. The document template store 215 may store these rendering parameters, their values, and a categorization of the type of receiving entities for which the originating entity has intended this online document rendering (e.g., receiving entities having a particular profile feature). Categorization is further described with reference to the document customization module 220. The document template datastore 215 may be accessed to generate online documents for completion by a receiving entity (e.g., accessed by the document completion module 240).

The document customization module 220 enables an originating entity to customize an online document. For example, the document customization module 220 enables customization of the content and appearance of content of an online document as displayed on a client device of an receiving entity. To enable this customization, the document customization module 220 may provide various templates of online documents from which an originating entity may select, may generate a graphical user interface (GUI) through which an originating entity may create or edit an online document, or a combination thereof. In some embodiments, the document customization module 220 may automatically implement recommended adjustments to an online document to increase the likelihood that the online document meets a particular objective, which may be specified by the originating entity to the document customization module 220. Objectives may include having a receiving entity complete an online document, meeting rendering criteria or preferences of an originating entity, achieving accessibility for receiving entities with physical impairments (e.g., vision impaired), or any suitable metrics with which a performance of an online document may be accessed.

The document customization module 220 can receive a user selection of a rendering parameter for an online document. For example, an originating entity creates a clickwrap using a GUI generated by the document customization module 220 and rendering parameters of the clickwrap including the location of the "Agree" button received by the document customization module 220. In addition or alternatively, the document customization module 220 uses historical online documents to automatically customize an online document for completion by a receiving entity. For example, the document customization module 220 uses previously completed online documents and profile features of a receiving entity to determine that a rendering parameter associated with font size is to be increased to increase the likelihood of completion (e.g., for a receiving entity who is vision impaired). The document customization module 220 may store user selected rendering parameters in a data structure that is accessible for subsequent generations of the online document (e.g., in response to a receiving entity requesting to access the online document). The document customization module 220 may store the data structure in the document template datastore 215.

Figure 5:
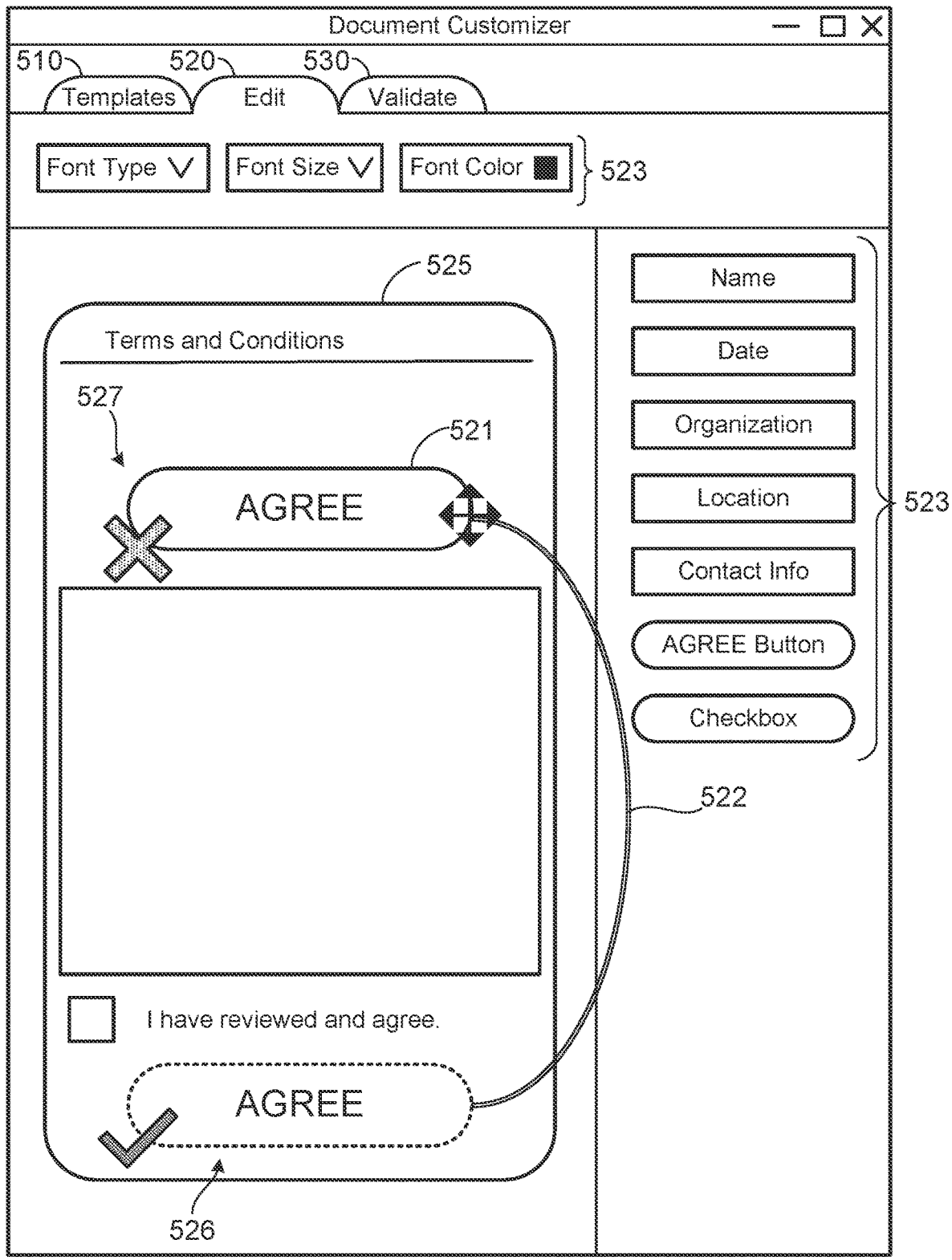
FIG. 5 depicts a graphical user interface for customizing an online document, according to one embodiment.

The document customization module 220 may provide a GUI to enable an originating entity to customize an online document. The GUI may have input elements that enable the originating entity to select rendering parameters for customizing the online document. The document customization module 220 may access the document metadata datastore 205 to display a menu of available rendering parameters from which an originating entity may select to include in an online document. As the originating entity interacts with the generated GUI, the document customization module 220 may determine whether the user's selections to customize the online document are valid. This is further described with reference to the validation module 225. An example of a GUI for customizing an online document is shown in FIG. 5.

The document customization module 220 may leverage the validation module 225, the recommendation engine 230, or a combination thereof when creating a customized online document. The document customization 220 can create online documents that are likely to be valid using the validation module 225 and can create online documents optimized to meet a particular objective (e.g., to be completed) using the recommendation engine 230. Similar to how the document customization module 220 can determine validity in substantially real time as a user is customizing an online document, the document customization module 220 may determine a recommended modification to the online document in substantially real time as a user is requesting access to an online document. For example, the document management system 110 receives a request from a receiving entity to access a clickwrap and before presenting the clickwrap to the receiving entity, the document customization module 220 modifies the online document according to a recommended modification determined by the recommendation engine 230 based on a profile feature of the receiving entity. The document management system 110 may then present a modified version of the online document that was modified according to the profile feature of the receiving entity.

The document customization module 220 may modify an online document or a template for the online document in response to a determination of a target rendering parameter that would optimize the performance of the online document (e.g., increase the likelihood that a receiving entity completes the online document). The document customization module 220 can modify an online document to include the target rendering parameter. For example, the document customization module 220 modifies the online document to expand portions of an online document that the originating entity has customized to be collapsed by default, where the modification is determined based on the receiving entity's previous interactions with completed online documents that included expanding collapsed text before providing their electronic signature. This recommended modification may be determined using the recommendation engine 230, described in additional detail below. The document customization module 220 can prompt an originating entity to request confirmation to modify an online document before proceeding to include the recommended target rendering parameter or may automatically modify the online document to include the recommended target rendering parameter.

The document customization module 220 may select a template from a set of online document templates to optimize the performance of an online document based on an originating entity or the receiving entities that complete online documents customized by the originating entity. The document customization module 220 may use a machine-learned model to select a template associated with a threshold likelihood for historical receiving entities to complete the online documents generated from the selected template. For example, the document customization module 220 may use one of the recommendation models 231 to determine that a template including rendering parameters for a particular iframe window size is more likely to result in a completion of the online document for receiving entities who are using mobile devices. The recommendation models are described in additional detail further below. The document customization module 220 may then assign the selected template as a default template for presenting to receiving entities of the originating entities. For example, the originating entity may select a template that renders an online document with the particular iframe window size as default for receiving entities who are requesting the online document from a mobile device.

The document customization module 220 may generate templates for online documents. The document customization module 220 may use a machine-learned model to generate the templates. For example, the document customization module 220 may random select or iterate through various permutations of rendering parameters for input into a machine-learned model (e.g., one of the recommendation models 231) configured to receive rendering parameters and optionally, contextual information to determine a likelihood of achieving a particular objective (e.g., having a receiving entity click the "Agree" button on a clickwrap) when presented with an online document generated using the rendering parameters input into the machine-learned model.

The document customization module 220 may categorize or label the generated templates for storage in the document template datastore 215. Using the categories or labels, the document customization module 220 may query for the templates based on the various categories or labels. The categories or labels may be associated with the originating entity, receiving entity, rendering parameters, online document type, or any suitable characteristic of an online document. For example, the document customization module 220 may label a template using a type of industry in which the originating entity belongs (e.g., educational), a type of document (e.g., terms of service), and a rendering parameter (e.g., the presence of a hyperlink displayed with text reading "university academic probation policy").

In some embodiments, the document customization module 220 may generate customized online documents and store the generated online documents at a datastore in the document management system 110. Alternatively or additionally, the document customization module 220 may generate a customized online document in response to receiving a request from a receiving entity to access the online document. In such embodiments, the document customization module 220 does not store the customized online documents, increasing memory resources available at a computing server(s) on which the document management system 110 operates. Rather, the document customization module 220 may persistently store templates for the online documents only, where the templates occupy less memory space than the online documents generated from them, and generate online documents on a per request basis. Additional mechanisms for increasing storage resources are described with respect to the document completion module 240.

The document customization module 220 may include instructions for monitoring user interactions with an online document when customizing the online document. In some embodiments, the online document may be rendered using web page code (e.g., HyperText Markup Language (HTML)) that includes a script for tracking user interactions. For example, the document customization module 220 may include a JavaScript for tracking the user interactions with a scroll bar controlling portions of the online document displayed within a frame. In some embodiments, the document customization module 220 may include a tracking pixel to determine that a receiving entity has accessed the online document, an IP address with which the receiving entity accessed the online document, a time at which the online document was accessed, a type of application (e.g., Internet browser or e-mail application) used to access the online document, or any suitable information collectable via a tracking pixel. The tracking data received in response to a client device executing the instructions when rendering the online document for display may be stored at the account datastore 200 and accessed for recommending subsequent customizations (e.g., by the recommendation engine 230). Data associated with user interactions may include one or more of a percentage of a historical online document accessed by a historical receiving entity using a corresponding client device, a duration of time that the historical online document was displayed at the corresponding client device, or a completion status of the historical online document.

The validation module 225 verifies that an online document is valid. Validity may be defined by whether a completed online document is legally binding. That is, an invalid online document is not legally binding when executed or completed by a receiving entity and a valid online document is legally binding when completed by the receiving entity. The content or appearance of content as the online document is rendered for completion may impact whether the online document is valid. Accordingly, the validation module 255 may verify that a set of rendering parameters used by the document management system 110 to generate an online document would be invalid or valid. The validation module 225 may use a machine learned model to determine whether an online document is valid. Additionally or alternatively, the validation module 225 may use a database of rendering rules to determine whether an online document is valid.

The validation module 225 may use the model 226 to determine whether one or more rendering parameters used for generating an online document is valid. The model 226 may be a machine-learned model, statistical model, or any suitable algorithm for determining a likelihood that one or more rendering parameters would generate a valid online document. Machine learning models used by the document management system 110 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof. These models can be any suitable machine learning model including neural networks for either regression or classification, random forest classifiers or regression models, logistic regression for classification, or linear regression. Training of these models is discussed in more detail with respect to the model training engine 235.

The validation module 225 may input a user-selected rendering parameter into the model 226. Additionally, the validation module 225 may input contextual information into the model 226. For example, the validation module 225 may input user selected rendering parameters including a font type, iframe window size, a checkbox status on a clickwrap (e.g., a checkbox next to text reading "I have read the agreement") in addition to contextual information indicating that the online document is to be accessed by users in Europe. The validation module 225 may receive, as an output from the model 226, a validity classification of the online document. The validity classification may be a direct or indirect indicator of validity. Direct indicators of validity may be a binary flag corresponding to "valid" or "invalid" determinations. An indirect indicator of validity may be a score or likelihood of validity, where a final determination of "valid" or "invalid" is based on an additional decision (e.g., thresholding the determined score against a minimum score for determining that the online document is valid). For example, the validation module 226 may receive a likelihood from the model 226 that the online document will be legally binding when presented in Europe, where certain countries prohibit pre-checked checkboxes in online documents and others allow pre-checked checkboxes. The validation module 226 may determine that the online document is likely to be valid with a seventy percent chance, as seventy percent of the receiving entities reside in countries where the pre-checked checkbox is allowed.

The validation module 225 may generate a feature vector for input into a machine-learned model. Dimensions of the feature vector may represent different data among the rendering parameters and contextual information accessed to determine validity. The feature vector may represent user-selected rendering parameters, values of the rendering parameters, and contextual information. For example, the validation module 225 generates a feature vector using a webpage coordinate location of an GUI input button based on an originating entity's drag and drop of an agree button to the top of an iframe (e.g., above a textbox showing the agreement terms) and using locations of receiving entities that have previously received online documents generated by the originating entity. In some embodiments, the validation module 225 may attribute weights for feature vectors input into the machine-learned model. Different weights may be used depending on the data included within the feature vector. For example, when contextual information represented within the feature vector includes the location of the receiving entity, the validation module 225 may determine to weigh the location of the receiving entity greater than another contextual information type (e.g., the type of device used by the user) when determining the validity of the online document.

The validation module 225 may use a database of rendering rules to determine a rule that causes an online document to be invalid due to a particular rendering parameter. Rendering rules may include jurisdiction or location based rules. For example, a country may have a rule that prohibits pre-checked checkboxes on online documents. The database of rendering rules may be manually updated by a user (e.g., by an originating entity) or periodically updated automatically (e.g., the validation module 225 periodically requests a download of rendering rules from a third-party service that generates rules defining what is invalid and valid for online documents). In some embodiments, the rendering rules includes a series of conditional tests that outputs a determination of validity upon receiving, as input, rendering parameters, contextual information, or a combination thereof. The series of conditional tests may also output the particular rendering rule(s) that were or were not satisfied by the inputs. The database of rendering rules may be included within the document management system 110 (e.g., stored at the server(s) hosting the document management system 110) or stored remotely.

The validation module 225 may, in response to a validity classification indicating that the online document is invalid, provide a notification to a client device for display identifying a rendering parameter that contributed to the validity classification. For example, the validation module 225 may cause an alert to be displayed at the GUI generated by the document management system 110 for customizing an online document, where the alert is displayed in response to a user's customization that is determined to be invalid. For example, an originating entity uses the GUI to request that a checkbox at an online document be pre-checked and in response, the validation module 225 displays a notification that the online document is now invalid or likely to be invalid. The notification may include a rule indicating a reason for why a particular rendering parameter causes an online document to be invalid. Following the previous example, the validation module 225 may display within the notification that the online document is likely to be invalid due to a particular country prohibiting pre-checked boxes. The validation module 225 may determine which rule to display based on a use of rendering rules. For example, the validation module 225 inputs the user's selection of a pre-checked checkbox into a test that applies rendering rules, and the test returns that the user's selection of the pre-checked box is flagged as invalid according to the particular country's rule prohibiting the pre-checked checkbox.

The validation module 225 may determine whether the user has selected a valid rendering parameter in substantially real time as the user is customizing an online document. As referred to here, substantially real time can refer to the determination of validity shortly after receiving the user's selection (e.g., within a second or a fraction of a second). For example, the validation module 225 may receive the output from the model 226 at a shared time (i.e., the same point in time) at which an originating entity is detected to be interacting with a GUI generated by the document customization module 220. The validation module 225 may then provide the determination to the user within the same editing session of the online document. For example, the validation module 225 may output a notification at a shared time at which the originating entity is detected to be interacting with the GUI (e.g., the document customization module 220 detects that a user is interacting with the GUI in response to determining that the current session in which the user has accessed the GUI has not yet finished).

The recommendation engine 230 recommends an adjustment to rendering parameters of an online document to optimize the online document. Optimization of the online document may refer to an increase in likelihood that an online document meets an objective. Objectives may include a completion of the online document by a receiving entity, meeting required rendering parameters set by an originating entity for a desired online document, or a combination thereof. The recommendation engine 230 may use a machine-learned model, a statistical model, or any suitable algorithm for determining a likelihood that one or more rendering parameters of an online document meets an objective. The recommendation engine 230 may present the recommended adjustment to an originating entity for confirmation to modify an online document or may automatically modify the online document with the recommended adjustment. In some embodiments, the recommendation engine 230 may iterate through various permutations of rendering parameters for rendering an online document to determine a permutation that is most likely to achieve an objective (e.g., cause a receiving entity requesting the online document to complete the online document).

The recommendation engine 230 may apply a machine-learned model to an online document to determine whether the addition, exclusion, or modification of a rendering parameter may increase the likelihood that the online document meets an objective. This rendering parameter that may be added, excluded, or modified may be referred to as a target rendering parameter. The recommendation engine 230 may apply a machine-learned model to make a determination regarding a target rendering parameter. The recommendation models 231 may be machine-learned models configured to determine the likelihood that the online document rendered using the target rendering parameter meets an objective.

In one example, the recommendation engine 230 may apply a machine-learned model to determine that the addition of a target rendering parameter corresponding to a hyperlink to additional information for the terms in the agreement increases the likelihood that an online document meets the objective of being executed by the receiving entity. In another example, the recommendation engine 230 may apply a machine-learned model to determine that the exclusion of a target rendering parameter corresponding to a header increases the likelihood that an online document meets an objective. In yet another example, the recommendation engine 230 can apply a machine-learned model to determine that the adjustment of a target rendering parameter corresponding to a font type increases the likelihood that an online document meets an objective.

The recommendation engine 230 may generate a feature vector representative of one or more rendering parameters, metadata of the online document (e.g., the type of online document such as a clickwrap), profile features of a receiving entity, additional contextual information, or a combination thereof. For example, the recommendation engine 230 generates a feature vector using an online document's user-selected values for a font type and a font size and using profile features of a receiving entity requesting the online document. In some embodiments, the recommendation engine 230 may attribute weights for feature vectors input into the machine-learned model. Different weights may be used depending on the data included within the feature vector. For example, the recommendation engine 230 may determine to weigh a particular type of profile feature greater than another type of profile feature when determining that the inclusion of a target parameter increases the likelihood that an online document is executed.

The recommendation models 231 may include multiple models that may determine recommended rendering parameter adjustments for different originating entities, receiving entities, objectives, types of documents, any suitable shared characteristic among online documents, or a combination thereof. For example, the recommendation models 231 may include a machine-learned model that is trained to determine recommended rendering parameter modifications for receiving entities with particular physical impairments. In another example, the recommendation models 231 includes a machine-learned model that is trained to determine recommended rendering parameter modifications for originating entities within a particular industry (e.g., retail, medical, banking, educational, etc.). The model training engine 235 described below may train particular models of the recommendation models 231 to be further customized for recommending rendering parameter modifications dependent upon a particular characteristic.

The customization module 220 may determine a feature of a profile characterizing a receiving entity. In some embodiments, the customization module 220 may maintain a profile for the receiving entity. The profile may include information provided by the receiving entity or the domain associated with the receiving entity (e.g., employment information such as the receiving entity's job title, location of employment, physical impairments related to using a computing device, etc.). The profile may include an accessibility feature indicating a preference for accessing the online document to accommodate a physical impairment. The profile may include a location feature indicating a geographic area in which the receiving entity resides or works. The profile may include information monitored by the document management system 110. For example, the profile may include monitored user interactions of the receiving entity with online documents that the entity has or has not completed. In another example, the customization module 220 may include within the receiving entity's profile information related to their access of the online documents (e.g., a hardware identifier of the device used to access the online document that indicates that the device is a mobile device). The customization module 220 may provide the determined feature to the recommendation engine 230 to determine an adjustment to rendering parameters of an online document. For example, the recommendation engine 230 may use the device type and vision impairment of a receiving entity as listed in their profile to determine a recommendation to increase a font size within a customized template of rendering parameters that was set as default, where the modified online document is provided to the vision impaired user on their mobile device.

The model training engine 235 trains machine-learned models of the document management system 110. The model training engine 235 accesses data for training the models in the training datastore 210. The model training engine 235 may also submit data for storage in the training datastore 210. The model training engine 235 may receive labeled training data from a user or automatically label training data (e.g., using outputs from a trained machine learning model). In an example of training a machine-learned model for validating online documents, training data may include a combination of rendering parameters, contextual information, and a label indicating that the combination resulted in a valid document. In an example of training a machine-learned model for recommending an adjustment to an online document to achieve a particular objective, training data may include a combination of rendering parameters, contextual information, and a label indicating that the combination resulted in a completion of the online document.

In some embodiments, the model training engine 235 trains a machine learning model in multiple stages. In a first stage, the model training engine 235 may use generalized data collected across one or more originating entities customizing and providing online documents for completion. The generalized data may be labeled to indicate whether online documents were valid or achieved a particular objective. For example, the model training engine 235 uses historical online documents from multiple originating entities, corresponding contextual information, and labels that the historical online documents were invalid. The model training engine 235 then creates a first training set based on the labeled generalized data. The model training engine 235 trains a machine learning model, using the first training set, to identify a target object. For example, the model training engine 235 trains the model 226 to determine a likelihood that one or more rendering parameters will cause an online document to be invalid.

In a second stage of training, the model training engine 235 may use data collected by the users to optimize models (e.g., to particular online document types or entities). The model training engine 235 can create a second training set based on feedback received from originating or receiving entities. For example, an originating entity may provide the model training engine 235 with a collection of online documents that were deemed to be invalid (e.g., after manual inspection for legality). In another example, a receiving entity may provide the model training engine 235 with indirect feedback in the form of their interactions with the online document. For example, a lack of completion of an online document may be monitored by the document management system 110 for use by the model training engine 235 to label rendering parameters and contextual information associated with the incomplete online document. Furthermore, the second training set may be created based on user feedback associated with successful identifications from models trained in the first stage. For example, a user provides feedback that a machine-learned model correctly identified a valid online document. In some embodiments, the first training set used to train that model may also be included in the second training set to further strengthen a relationship or association between data (e.g., rendering parameters and contextual information) and determinations of validity or recommended modifications during the second stage of training. The model training engine 235 then re-trains a machine learning model using the second training set such that the machine learning model is customized to a particular entity's feedback for what is valid or invalid or feedback for what achieves a particular objective.

The model training engine 235 may generate a feature vector from data in the training datastore 210. In some embodiments, the model training engine 235 generates a feature vector representative of rendering parameters of a historical online document, document type of the historical online document, and a geographic location at which the historical document was rendered for display. The model training engine 235 may label the generated feature vector with a label indicating the validity of the historical online document (e.g., a user provides feedback that the historical online document was or was not valid). Such a feature vector may be used to train machine-learned models used to predict a validity of an online document. In some embodiments, the model training engine 235 generates a feature vector using historical online documents and profiles of historical receiving entities to which the historical online documents were provided for completion. The model training engine 235 may label the generated feature vector with a label indicating whether a particular objective was achieved after providing the historical online documents (e.g., whether the documents were completed, whether the documents met criteria set by the originating entity, etc.).

The document completion module 240 facilitates the completion of a customized online document by a receiving entity. The document completion module 240 receives a request from a receiving entity to access an online document. The document completion module 240 may determine that an online document has been completed in response to receiving, from a client device of a receiving entity, user input indicating that the receiving entity has agreed to content within the online document. For example, the document completion module 240 may determine that a clickwrap agreement has been accepted by the receiving entity in response to receiving user input indicating that the receiving entity has clicked an "Agree" button of the clickwrap agreement. In some embodiments, the document completion module 240 may generate a certificate of completion to be stored with rendering parameters of the completed online document. The document completion module 240 may create a data structure storing metadata for creating a record of the execution (e.g., storing date, time, and a signature or indication that the user selected a button to provide their consent or signature).

The document completion module 240 may provide an online document that has been modified based on a target rendering parameter (e.g., including or excluding the target rendering parameter to increase the likelihood of achieving an objective). In particular the document completion module 240 may provide the online document by generating an inline frame (iframe) for display at a webpage, where the iframe includes the modified online document. The iframe may enable originating entities using the document management system 110 to incorporate the customized online documents on websites of the originating entities. This may be in contrast to redirecting a receiving entity to a website of the document management system 110 from the website of an originating entity.

The interface 245 is an interface for a user and/or a third-party software platform to interact with the document management system 110. The interface 245 may be a software as a service platform that is accessible by the client device through network 120. Although the interface 245 is shown at the document management system 110, the interface 245 may be a web application that is run by a web browser at a user device. The interface 245 may be the front-end component of a mobile application or a desktop application. In one embodiment, the interface 245 may use application program interfaces (APIs) to communicate with user devices or third-party platform servers, which may include mechanisms such as webhooks.

FIG. 3 shows a conceptual illustration of an online document generated by the document management system 110, according to one embodiment. An online document 300 is shown to illustrate an example configuration corresponding to a template of rendering parameters such as the rendering parameters 324 shown in the rendering instructions 320. The rendering instructions 320 reflect instructions for rendering the completed online document 310, which is a populated and executed version of the online document 300. Online documents generated and managed by the document management system 110 may have additional, fewer, or different components than shown in the online document 300. Rendering instructions for generating an online document for execution may have additional, fewer, or different instructions than shown in the rendering instructions 320.

Figure 4:
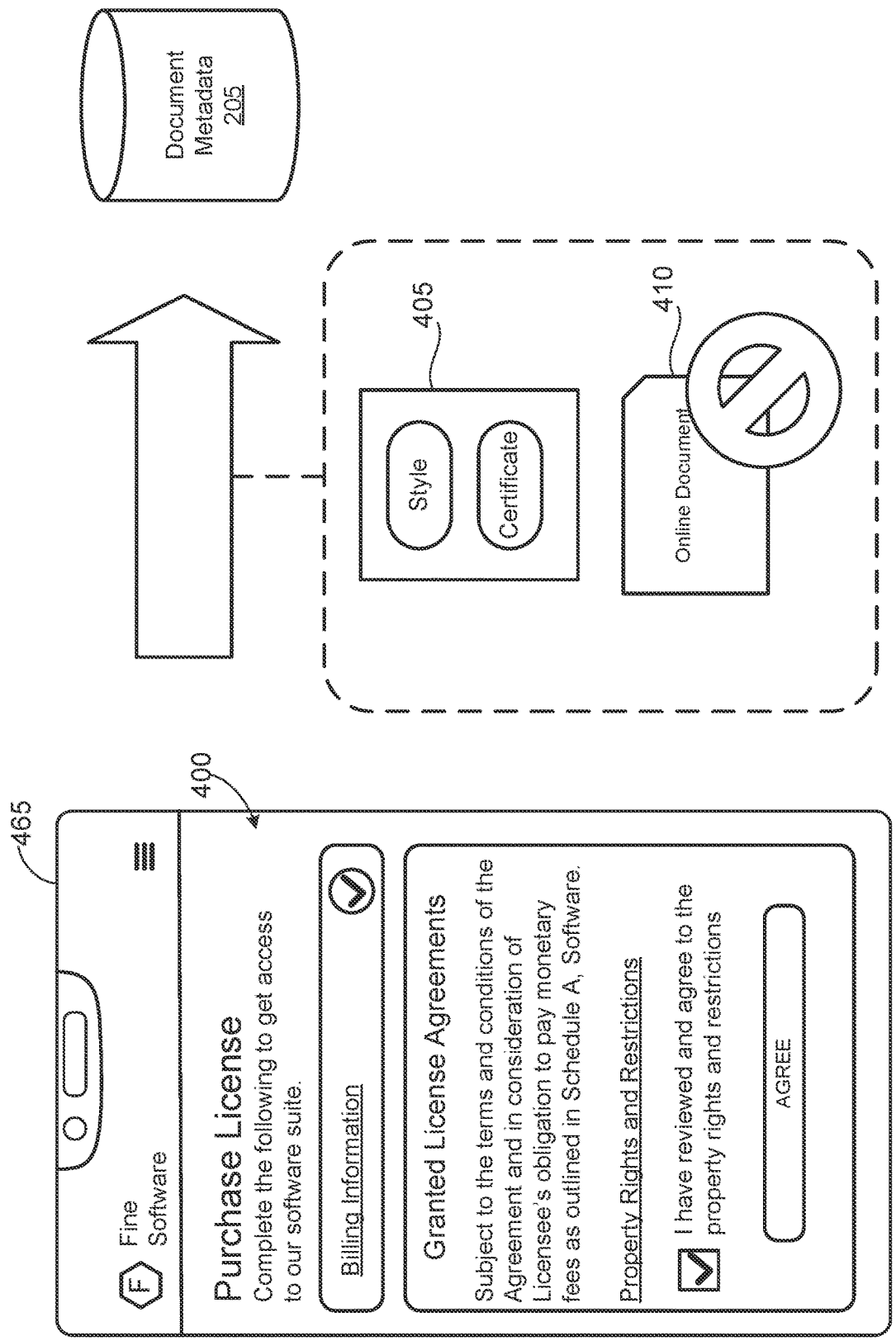
FIG. 4 shows a conceptual illustration of storing metadata of an online document, according to one embodiment.

The document management system 110 may receive a receiving entity's request to access the online document 300 for completion (e.g., to certify the receiving entity's employment information before accessing a resource available for employees of the "Test Company Name" company). The document management system 110 may then access a user-customized template of rendering parameters (e.g., generated using the document customization module 220 and stored in the document template datastore 215) and generate the online document 300, or a populated version of the online document 300 that includes content fields 301 pre-populated, at a receiving entity's client device. The receiving entity may interact with the generated online document to complete the online document. For example, the receiving entity may select a checkbox indicating that they consent to provide electronic certification after they press the "Agree" button to complete the online document. After the document is completed, metadata of the online document (e.g., the rendering parameters 324, the content 321, and a certificate of completion) may be stored by the document management system 110 for reproducing the completed online document 310 (e.g., for auditing purposes). A conceptual illustration of this is shown in FIG. 4.

The document management system 110 may execute rendering instructions similar to the rendering instructions 320 to generate an online document for a receiving entity to complete. The rendering instructions may be JavaScript or any other suitable object oriented programming language. In some embodiments, the document management system 110 may execute the rendering instructions in response to a receiving entity navigating to a resource (e.g., webpage, file, etc.) of an originating entity that requires the execution of the online document before the receiving entity can access the resource. The rendering instructions used to generate the online document may include the rendering parameters 324. In some embodiments, the rendering instructions includes variables (e.g., "email," "fullName," etc.) for the content 321 that have not yet been assigned particular value (e.g., because the receiving entity has not specified the values to the document management system 110). The document management system 110 may present the online document 300 to a receiving entity with the content fields 301 configured to be interactive. For example, the receiving entity may select the "Full Name" content field 301 and type in "Mary Wilson," which the document management system 110 stores in the content 321. The completed content fields 311 may be the product of the receiving entity interacting with the online document 300 to provide the content 321.

In some embodiments, the document management system 110 may determine the account identifier 322 of the receiving entity (e.g., determined using the receiving entity's login credentials provided when the receiving entity logged into their account with the document management system 110) to pre-populate the variables with the content 321. For example, the document management system 110 uses the account identifier 322 to query the account datastore 200 for the content 321 to prepopulate the online document 300. In this scenario, the online document 300 may be inaccessible to a receiving entity. That is, rather, the receiving entity may see the pre-populated online document in the corresponding fields within the online document 300 (e.g., the content fields 301).

In response to a receiving entity completing the online document 300, the document management system 110 may create an identifier 323 for the completed online document. The document management system 110 may assign a value to the "clickwrapId" variable, where the assigned value serves as the identifier 323. The document management system 110 may store metadata of the completed online document 310 (e.g., the rendering parameters 324, the content 321, and a certificate of completion that includes a time, date, and signature) for subsequent access to the completed online document.

FIG. 4 shows a conceptual illustration of storing metadata 405 of an online document 400, according to one embodiment. The online document 400 is shown as a clickwrap. The document management system 110 may store the metadata 405 associated with the online document. The metadata 405 may include rendering style used to display the online document 400 on a client device 465 of a receiving entity. The metadata 405 may further include a certificate of completion indicating an identifier of the receiving entity, a date, and a signature provided by the receiving entity. For example, the certificate of completion may include an account identifier of the receiving entity used to access the online document 400, the date on which the receiving entity clicked the "Agree" button, and an identifier of the online document 400 (e.g., similar to the clickwrap identifier 323) generated in response to the receiving entity clicking the "Agree" button after selecting the appropriate checkboxes in the online document 400 (e.g., the checkbox next to the statement "I have reviewed and agree . . . " and the checkbox next to a URL for accessing billing information).

The document management system 110 can store metadata 405 into the document metadata datastore 205 instead of storing a file 410 of the completed online document (e.g., a PDF file of a webpage showing the receiving entity's selection of the checkboxes and a certificate of completion tag showing a timestamp at which the "Agree" button was selected). The document management system 110 may create the file 410 on-demand in response to a user's request (e.g., an originating entity's request) to view the completed online document. For example, the document management system 110 queries the document metadata datastore 205 using a clickwrap identifier included within the metadata 405. The document management system 110 may then generate the file 410 using the metadata 405. For example, the document management system 110 may execute rendering instructions that include the metadata 405, where the rendering instructions may be similar to the rendering instructions 320. In some embodiments, the document management system 110 may generate a particular version of an online document that is associated with corresponding metadata. The document management system 110 may store versions of online documents and corresponding metadata, and use this version storage architecture to generate the particular version of the online document. The file 410 may occupy more storage space in the datastore 205 than the metadata 405. Accordingly, by storing the metadata 405 instead of the file 410, the document management system 110 reduces the amount of storage resources expended to records of receiving entities' completed online documents.

FIG. 5 depicts a GUI 500 for customizing an online document 525, according to one embodiment. The GUI 500 may be generated by the document management system 110 for access at a client device (e.g., a client device of an originating entity). For example, the document customization module 220 causes the GUI 500 to be generated. The GUI 500 includes navigational tabs 510, 520, and 530. The GUI further includes input elements for rendering parameters 523 that can be used to customize the online document 525. For example, the originating entity may choose to include the "Agree" button 521 within the online document 525. Different, additional, or fewer components of a GUI for customizing an online document may be present than what is shown in FIG. 5.

The navigational tabs 510, 520, and 530 corresponding to different functionalities provided by the document management system 110 that are available at the GUI 500. A user's selection of the navigational tab 510 may cause the GUI 500 to update from what is displayed at FIG. 5, where the updated GUI shows various templates for online documents that an originating entity may choose from. These templates may include templates generated using the recommendation engine 230 or previously customized templates created using the document customization module 220. The navigational tab 520, which is displayed in FIG. 5 as being presently selected, corresponds to an interface for customizing an online document. The navigational tab 530 may be selected to update the GUI 500 to display an interface for validating a customized online document (e.g., the online document 525 being created in the Edit interface).

In some embodiments, validation of customized online documents may also be performed while a user is customizing an online document. FIG. 5 includes a user interaction 522 involving the drag and drop of the "Agree" button 521 from one position to another in the layout of the online document 525. The document management system 110 may determine that the user has requested to move the button 521 from a first position 526 to a second position 527 on the layout of the online document 525. For example, the document customization module 220 may monitor the user's interactions with the GUI 500 (e.g., via JavaScript routines with event listeners for monitoring clicks, selections, drag, drop, hold, or any suitable user interaction with a GUI element). The document management system 110 may receive a location of where the user has requested to move the button 521 (e.g., a pixel height within the pixel boundaries for the online document 525), corresponding to the second location 527, and determine that the placement of the button 521 at the second location 527 would cause the online document 525 to be invalid.

For example, the document management system 110 may apply a machine-learned model (e.g., the model 226) to a rendering parameter representing the second location 527 for the button 521, and the model 226 may return a likelihood that the online document 525 is invalid. Optionally, the document management system 110 may input additional rendering parameters into the model 226, such as the location of a text box in which a terms of service may be displayed, the location of a checkbox for confirming the user has reviewed and agrees to the terms of service, a status of the checkbox (e.g., whether unchecked or checked), font types, font sizes, any suitable rendering parameter representing the formatting in which content is displayed at the online document 525, or a combination thereof. Furthermore, the document management system 110 may also input contextual information into the model 226 such as information about the receiving entities of the online document 525 (e.g., locations, types of devices accessing the online document, etc.).

The document management system 110 may determine in substantially real time that the user interaction 522 requesting the button 521 to be moved to the position 527 causes the online document 525 to be invalid. The term "substantially real time" may refer to the determination of invalidity occurring at a shared time instance as the user is performing the interaction 522. For example, as the user is dragging the button 521 and before the user has dropped it at the position 521, the document management system 110 receives the locations of the button 521 as it is being moved and applies the model 226 to one or more of the received locations. Although not shown in FIG. 5, the document management system 110 may also generate for display a notification at the GUI 500 indicating that the user has requested a customization that is causing the online document 525 to be invalid. For example, as the user performs the interaction 522, dragging the button 521 to a desired location, and reaches a location on the online document 525 where placement would not be valid, the document management system 110 may generate a notification overlaying the customization interface that notifies the user that the online document 525 would likely be invalid.

Example Processes Using the Document Management System

Figure 6:
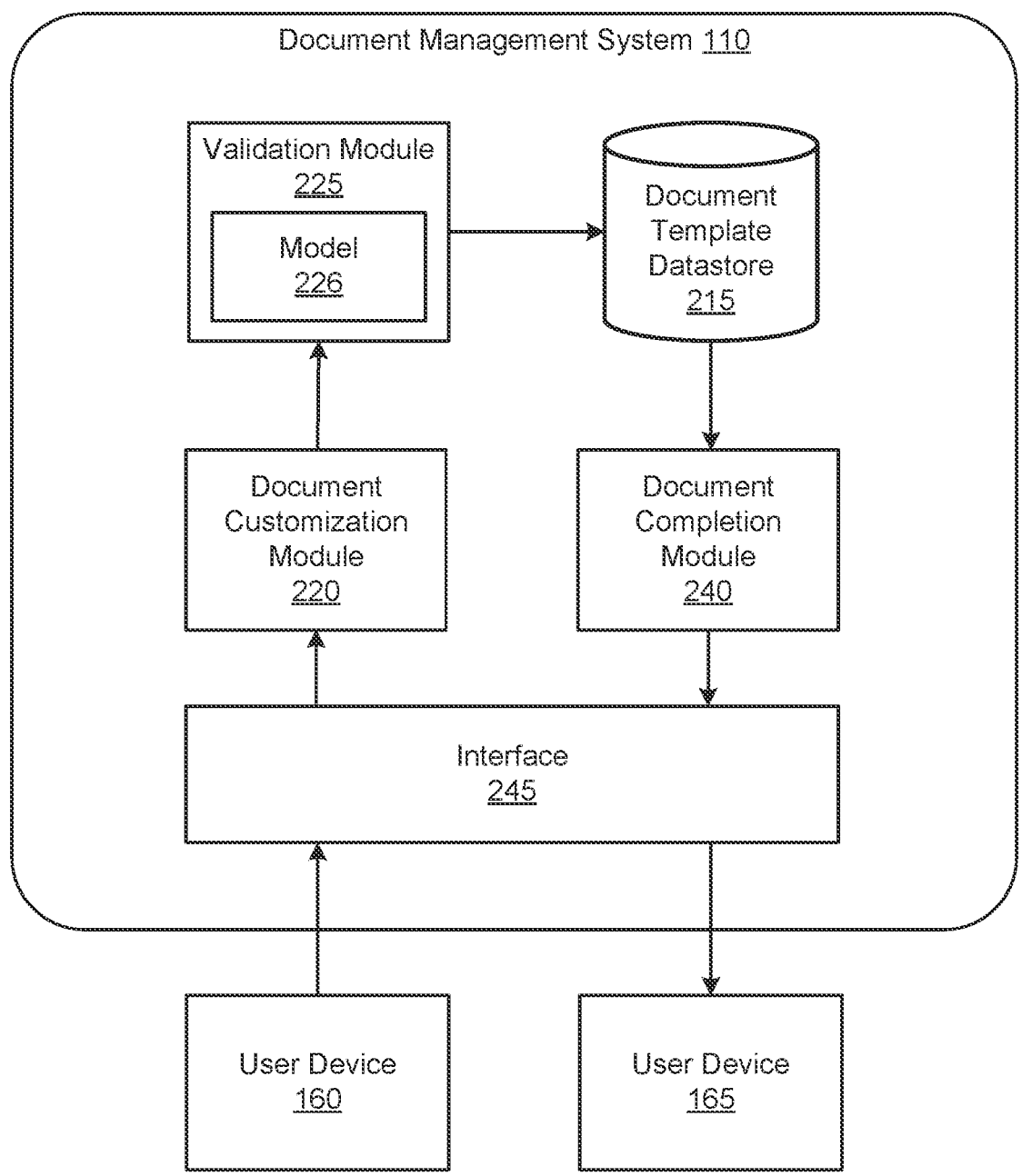
FIG. 6 depicts a block diagram of a process for generating and validating a customized online document, in accordance with one embodiment.

FIG. 6 depicts a block diagram of a process 600 for generating and validating a customized online document, in accordance with one embodiment. The process 600 references components of FIGS. 1 and 2. In one example, the process 600 may be used to determine that a user's pre-check of a checkbox of an online document (e.g., clickwrap) is not prohibited in a particular country. In another example, the process 600 may be used to determine that the font of the online document is not distinguishable from the remainder of a webpage in which it is included and is likely to be invalid. In yet another example, the process 600 may be used to determine that the location and size of a checkbox is likely to be invalid (e.g., buried between paragraphs of text or too small).

An originating entity uses the user device 160 to customize an online document. The document management system 110 receives user inputs from the user device 160 via the interface 245. The user inputs may include interactions with a GUI generated by the document customization module 220 to customize an online document (e.g., as shown in FIG. 5).

The interactions may correspond to user-selected rendering parameters, such as a location of an "Agree" button, the font type of text in the online document, the font size, whether a checkbox is pre-checked, etc. The document customization module 220 inputs one or more of the user-selected rendering parameter and optionally, contextual information, into the validation module 225, which determines a likelihood that an online document generated using the rendering parameters would be invalid (e.g., invalid given the contextual information such as the location where the online document is to be presented or whether the recipient has a physical impairment). The validation module 225 may apply the model 226 to the received inputs, where the model 226 can be a machine-learned model trained from previously generated online documents that where labeled to be valid or invalid. In response to determining that the rendering parameters are likely to result in a valid online document, the document management system 110 may store the rendering parameters into the document template datastore 215.

A receiving entity uses the user device 165 to request the customized online document. The document completion module 240 may receive the request and in response, retrieve the rendering parameters stored in the document template datastore 215. For example, although the request from the user device 165 to the document management system 110 is not shown (refer to FIG. 7 for a depiction of the request), the request may include identifying information with which the document management system 110 may use to retrieve the appropriate rendering parameters. Identifying information may include an account identifier associated with the receiving entity's account with a platform of the originating entity (e.g., an online account with a social networking website that has requested its users to agree to updated terms of service), an identifier associated with the originating entity (e.g., a website domain name from which the request for the customized online document was received), or any suitable identifier for mapping an online document to a receiving entity intending to execute the online document. The document completion module 240 may generate the online document using the retrieved rendering parameters, or template of rendering parameters, and provide the online document to the user device 165 via the interface 245.

Figure 7:
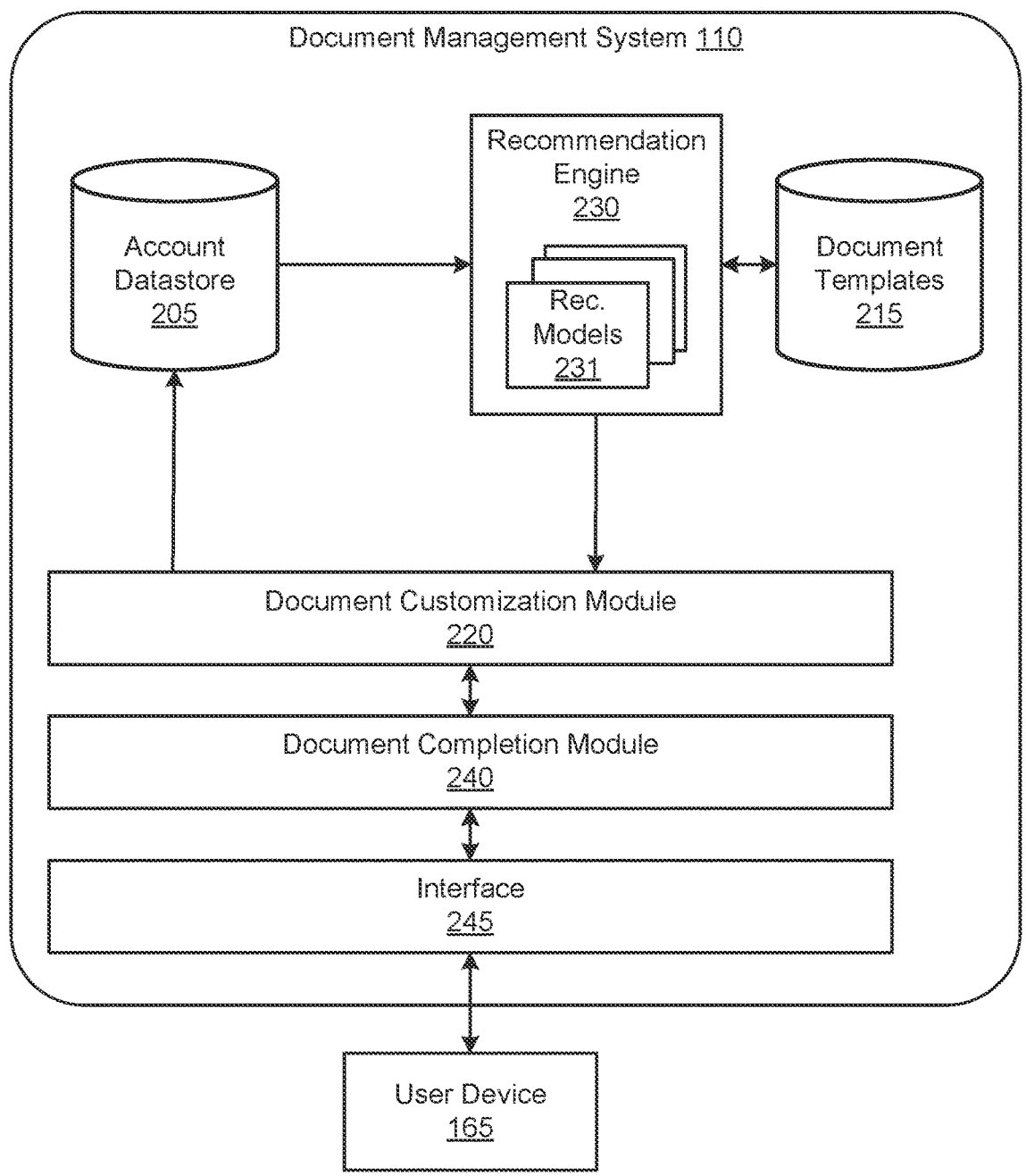
FIG. 7 depicts a block diagram of a process for recommending an online document based on a user requesting the online document, in accordance with one embodiment.

FIG. 7 depicts a block diagram of a process 700 for recommending an online document based on a user requesting the online document, in accordance with one embodiment. The process 700 references components of FIGS. 1 and 2. In one example, the process 700 may be used to recommend a template for an online document that includes an image of a logo of the document management system (e.g., a DocuSign logo) over using a default template without the logo, where the recommendation is based on historical interactions where the receiving entity has been more likely to execute documents with the system's logo than without. In another example, the process 700 may be used to recommend a change in colors used in the online document based on profile information of the receiving entity indicating that they have a vision impairment (e.g., color blind).

A receiving entity uses the user device 165 to transmit a request to the document management system 110 to access an online document. The document management system 110 receives the request via the interface 245. The request may include information identifying the user of the user device 165, identifying the originating entity that created the online document being requested, or identifying the online document. The user's request to access an online document is received by the document completion module 240. Before providing the online document to the user device 165, the document completion module 240 may instruct the document customization module 220 to determine a recommended online document or a recommended modification that can be made to an existing online document to increase the likelihood that an objective is met when presenting the online document at the user device 165. The document customization module 220 accesses the account datastore 205 to retrieve information about the receiving entity of the user device 165. For example, the document customization module 220 may query the account datastore 205 using an identifier of the receiving entity received with the request for the online document.

The process 700 may include one or more of determining a modification to an existing online document or selecting a template based on information about the receiving entity (e.g., features of a profile of the receiving entity) queried from the account datastore 205. The document customization module 220 may leverage the recommendation engine 230 for determining a custom online document to present to the receiving entity. The recommendation engine 230 may input a feature of the receiving entity's profile and a target rendering parameter into one or more of the recommendation models 231. The recommendation engine 230 may access datastores of the document management system 110 (e.g., the document templates datastore 215 or the document metadata datastore 205) to retrieve a target rendering parameter for input into a recommendation model 231. The recommendation model 231 may output the likelihood that an online document generated using the target rendering parameter will result in achieving an objective given the receiving entity's feature. The recommendation engine 230 may also apply a recommendation model 231 to the receiving entity's feature(s) and rendering parameters of template within the document templates 215 to determine a likelihood that a particular template will achieve a particular objective given the receiving entity's feature(s).

The document customization module 220 may determine to present a modified online document (e.g., a default online document modified to include a target rendering parameter) or a selected template for the receiving entity to complete. In some embodiments, the document customization module 220 may determine whether the likelihood of the modified online document or selected template exceeds a threshold likelihood. In response to determining that the threshold likelihood is met or exceeded, the document customization module 220 may provide the modified online document or selected template to the document completion module 240 to provide to the user device 165 via the interface 245. In response to determining that the threshold likelihood is not met or exceeds, the document customization module 220 may instruct the document completion module 240 to provide a default online document (e.g., unmodified online document or a default template provided to a group of receiving entities) to the receiving entity.

Figure 8:
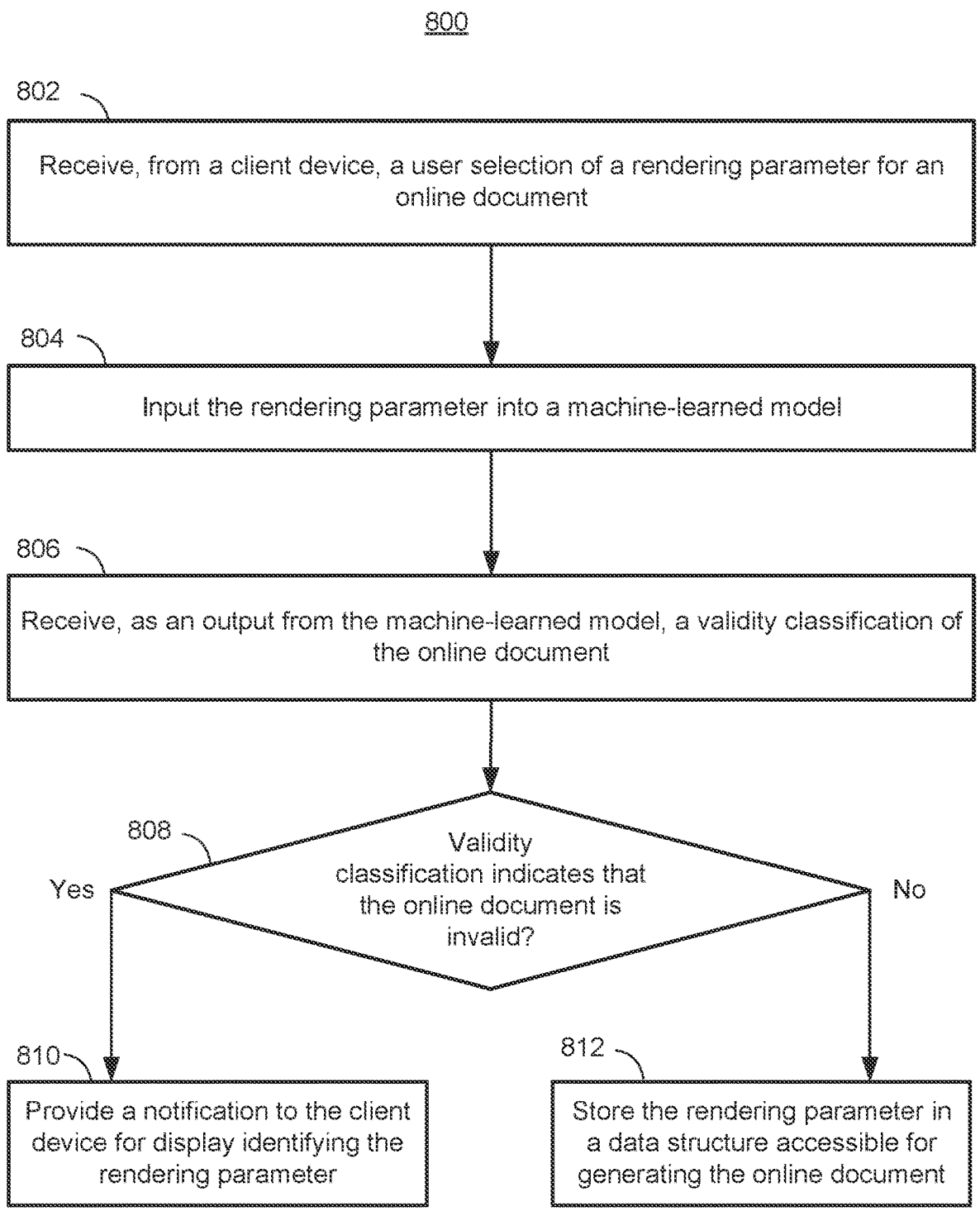
FIG. 8 is a flowchart illustrating a process for validating an online document before execution using the document management system of FIG. 1, in accordance with one embodiment.

FIG. 8 is a flowchart illustrating a process 800 for validating an online document before execution using the document management system 110, in accordance with one embodiment. The document management system 110 may perform the process 800. In some embodiments, the document management system 110 performs operations of the process 800 in parallel or in different orders, or may perform different operations.

The document management system 110 receives 802, from a client device, a user selection of a rendering parameter for an online document. In one example, an originating entity may request that the document management system 110 generate a clickwrap agreement with a checkbox next to text reading "I have read the terms and conditions herein" pre-checked (e.g., the box includes a check when initially rendered for the receiving entity to execute). The originating entity may use their client device to access the customization GUI offered by the document management system 110 to check the checkbox. Alternatively, the originating entity may use their client device to access various templates offered by the document management system 110, where a template they select includes the checkbox pre-checked. The aforementioned placement and selection are examples of receiving 802 user selections of a rendering parameter for an online document. That is, the selection of a value for the checkbox status (prechecked or unchecked) for their clickwrap.

The document management system 110 inputs 804 the rendering parameter into a machine-learned model. Following the previous example, the document management system 110 may input 804 the value of the checkbox status into a machine-learned model. The machine-learned model may be the model 226. The machine-learned model may be trained using clickwraps labeled as invalid or valid. In particular, the machine-learned model may be trained using rendering parameters of the clickwraps, where the rendering parameters may be individually labeled or labeled as a group to be invalid or valid.

The document management system 110 receives 806, as an output from the machine-learned model, a validity classification of the online document. Continuing the previous example, the document management system 110 may receive 806 as an output from the machine-learned model a validity classification of the clickwrap. In some embodiments, the machine-learned model may output a likelihood that the rendering parameter of the checkbox status being prechecked is valid. The document management system 110 may then compare the likelihood to a threshold. For example, the machine-learned model outputs that there is a twenty percent likelihood that the clickwrap with the checkbox prechecked is valid because the majority of receiving entities intended to access this clickwrap are in a location where the law prohibits prechecked clickwraps. The document management system 110 may compare that percentage to a threshold validity of ninety percent and determine that the clickwrap is invalid. That is, the validity classification is that the online document is invalid.

The document management system 110 determines 808 whether the validity classification indicates that the online document is invalid. In response to determining that the validity classification indicates that the online document is invalid, the document management system provides 810 a notification to the client device for display identifying the rendering parameter. Following the previous example, the document management system 110 may determine 808 that the clickwrap is invalid. In response, the document management system 110 may then provide 810 a notification to the originating entity's client device that reads "Invalid clickwrap" or "Prechecked checkbox will likely cause the clickwrap to be invalid due to relevant law in Europe. For further inquiries, please contact your organization's legal department."

In response to determining that the validity classification indicates that the online document is not invalid, the document management system stores 812 the rendering parameter in a data structure accessible for generating the online document. Using the previous example with modified context, the machine-learned model may output a validity classification indicating that the prechecked box is valid because the receiving entities are primarily located in a jurisdiction where the law does not prohibit prechecked boxes (e.g., based on contextual information related to the receiving entities' locations that are also input to the machine-learned model). Thus, the document management system 110 may determine 808 that the validity classification indicates the online document is not invalid and store 812 the status of the checkbox in a data structure that is accessible for generating the clickwrap (e.g., when a receiving entity associated with the originating entity requests it for execution).

FIG. 9 is a flowchart illustrating a process 900 for customizing an online document before execution using the document management system 110, in accordance with one embodiment. The document management system 110 may perform the process 900. In some embodiments, the document management system 110 performs operations of the process 900 in parallel or in different orders, or may perform different operations.

The document management system 110 receives 902, from a client device of receiving entity, a request for an online document. The receiving entity may perform a particular interaction with the online document to cause the completion of the online document. Interactions may include clicking an "Agree" button in a click-to-sign clickwrap or providing inserting an electronic rendering of their handwritten signature into an electronic agreement document. For example, the document management system 110 can receive 902, from a receiving entity's client device, a request for a clickwrap before creating an account with the originating entity (e.g., a social networking website asks a prospective user to complete a user agreement before interacting with other users). Once presented with the clickwrap, the receiving entity may click an "Agree" button to execute or complete the clickwrap. In this example, this click is an interaction with an online document that causes its completion.

The document management system 110 determines 904 a feature of the receiving entity from a profile characterizing the receiving entity. Following the previous example, the document management system 110 can determine 904 one or more interactions that the receiving entity has previously had with clickwraps, where the historical interactions are tracked as features in a profile of the receiving entity maintained by the document management system 110. The interactions can include a number or percentage of times a user has completed clickwraps showing the name or logo of the document management system 110 (e.g., a DocuSign logo is included at the top of the clickwrap). The interactions may additionally or alternatively include a percentage of times the user has completed clickwraps without the system's name or logo.

The document management system 110 inputs 906 a representation of the feature and a target rendering parameter into a machine-learned model. Continuing the previous example, the document management system 110 may input 906 a representation of the user interactions and a target rendering parameter corresponding to the inclusion of the document management system's logo into a machine-learned model (e.g., one of the recommendation models 231). The representation of the user interactions may be a feature vector representative of the user interactions and optionally, one or more of additional profile features, contextual information, or rendering parameters of an online document (e.g., a default clickwrap that does not have the document management system's logo).

The document management system 110 receives 908, as an output from the machine-learned model, a likelihood that the interaction is performed by the receiving entity. Following the previous example, the document management system 110 may receive 908, as an output from the machine-learned model, a likelihood that the receiving entity will click the "Agree" button of the clickwrap. Although not depicted in FIG. 9, the document management system 110 may determine whether to proceed to modifying 910 the online document that the receiving entity has requested based on the received 908 likelihood. The document management system 110 may compare the likelihood against a minimum threshold to determine that the online document should be modified in response to the received 908 likelihood exceeding the minimum threshold. That is, the receiving entity in the previous example, may click the "Agree" button with a likelihood that exceeds a minimum threshold if the logo of the document management system is added to the clickwrap that they're requesting (e.g., the default clickwrap provided to prospective users of the social networking website).

The document management system 110 modifies 910 the online document to include the target rendering parameter. The document management system 110 provides 912 the modified online document to the receiving entity for the completion of the modified online document. Continuing the previous example, the document management system 110 modifies 910 the clickwrap to include the document management system's logo. The document management system 110 then provides 912 the modified clickwrap to the receiving entity to complete the clickwrap having the added logo of the document management system.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, by one or more processors, a request for a document from a client device of a receiving entity;
   applying, by the one or more processors, a machine-learned model to a representation of a feature of a profile characterizing the receiving entity and a target rendering parameter for rendering content of the document;
   receiving, by the one or more processors and as an output from the machine-learned model, a likelihood that an interaction with the document rendered for display with the target rendering parameter is performed by the receiving entity causing a completion of the document;
   modifying, by the one or more processors and based on the likelihood, the document to render the content for display with the target rendering parameter; and providing, by the one or more processors, the modified document to the client device.

2. The method of claim 1, further comprising:
selecting, by the one or more processors and using the machine-learned model, a template of a plurality of templates, the selected template associated with a threshold likelihood for historical receiving entities to complete documents generated from the selected template; and
generating, by the one or more processors, the document using the selected template.

3. The method of claim 1, further comprising:
creating, by the one or more processors, a plurality of templates using the machine-learned model, each template including a respective plurality of rendering parameters.

4. The method of claim 1, further comprising:
training, by the one or more processors, the machine-learned model using historical documents and profiles of historical receiving entities to which the historical documents were provided for completion.

5. The method of claim 4, further comprising generating, by the one or more processors, the profiles of historical receiving entities using tracked user interactions with the historical documents.

6. The method of claim 5, further comprising:
tracking, by the one or more processors, the user interactions, wherein the user interactions include one or more of a percentage of a historical document accessed by a historical receiving entity using a corresponding client device, a duration of time that the historical document was displayed at the corresponding client device, or a click to complete the historical document.

7. The method of claim 1,
wherein the profile includes an accessibility feature indicating a preference for accessing the document to accommodate a physical impairment.

8. The method of claim 1,
wherein the profile includes a location feature indicating a geographic area in which the receiving entity resides.

9. The method of claim 1, further comprising, in response to receiving a notification that the receiving entity has completed the modified document:
storing, by the one or more processors, a mapping of a completion certificate and a plurality of rendering parameters for rendering the content of the document before the modifying and the target rendering parameter.

10. The method of claim 1, wherein providing the modified document comprises generating, by the one or more processors, an inline frame (iframe) including the modified document.

11. The method of claim 1, wherein the document is generated in a secured domain characterized by one or more of:
the one or more processors being centralized;
authentication requirements being enforced by the one or more processors;
malware protection for the one or more processors;
encryption of the document; or
secured access to the document.

12. The method of claim 1, wherein the document is completed in response to the receiving entity providing a user input via the client device indicating an agreement to terms of the document.

13. The method of claim 1, wherein the representation includes a feature vector comprising a plurality of dimensions, a subset of the plurality of dimensions corresponding to a plurality of rendering parameters for rendering the content of the document before the modifying, and the feature.

14. Non-transitory computer-readable storage media storing executable instructions that, when executed by one or more processors, cause the one or more processors to:
receive a request for a document from a client device of a receiving entity;
apply a machine-learned model to a representation of a feature of a profile characterizing the receiving entity and a target rendering parameter for rendering content of the document;
receive, as an output from the machine-learned model, a likelihood that an interaction with the document rendered for display with the target rendering parameter is performed by the receiving entity causing a completion of the document;
modify, based on the likelihood, the document to render the content for display with the target rendering parameter; and
provide the modified document to the client device.

15. The non-transitory computer-readable storage media of claim 14, wherein the instructions further cause the one or more processors to:
select, using the machine-learned model, a template of a plurality of templates, the selected template associated with a threshold likelihood for historical receiving entities to complete documents generated from the selected template; and
generate the document using the selected template.

16. The non-transitory computer-readable storage media of claim 14, wherein the instructions further cause the one or more processors to:
create a plurality of templates using the machine-learned model, each template including a respective plurality of rendering parameters.

17. The non-transitory computer-readable storage media of claim 14, wherein the instructions further cause the one or more processors to:
train the machine-learned model using historical documents and profiles of historical receiving entities to which the historical documents were provided for completion.

18. The non-transitory computer-readable storage media of claim 17, wherein the instructions further cause the one or more processors to generate the profiles of historical receiving entities using tracked user interactions with the historical documents.

19. A system comprising one or more processors and non-transitory computer-readable storage media storing instructions that, when executed by the one or more processors, cause the one or more processors to:
receive a request for a document from a client device of a receiving entity;
apply a machine-learned model to a representation of a feature of a profile characterizing the receiving entity and a target rendering parameter for rendering content of the document;
receive, as an output from the machine-learned model, a likelihood that an interaction with the document rendered for display with the target rendering parameter is performed by the receiving entity causing a completion of the document;

modify, based on the likelihood, the document to render the content for display with the target rendering parameter; and provide the modified document to the client device.

20. The system of claim 19, wherein the instructions further cause the one or more processors to:

select, using the machine-learned model, a template of a plurality of templates, the selected template associated with a threshold likelihood for historical receiving entities to complete documents generated from the selected template; and generate the document using the selected template.

* * * * *